Patented Apr. 10, 1951

2,548,741

UNITED STATES PATENT OFFICE 2,548,741

PREPARATION OF ESTERS OF ISOTHIOCYANIC ACID

Ralph E. Sayre, Stamford, Conn., assignor to American Cyanamid Company, New York, N. Y., a corporation of Maine No Drawing. Application March 12, 1948, Serial No. 14,632

19 Claims. (Cl. 260—454)

This invention relates to a new process for producing esters of isothiocyanic acid. More specifically, it relates to the preparation of isothiocyanic acid esters from 1,3-disubstituted thioureas.

Isothiocyanates, which are also known as "mustard oils," are a relatively large class of compounds, certain members of which are of industrial importance as insecticides and as intermediates in the manufacture of flotation agents and other articles of commerce.

The prior art discloses two general methods which have been employed for the preparation of isothiocyanates. In one of these methods, a disubstituted thiourea is reacted with a suitable acid or acid anhydride, whereby half of the amine equivalent of the thiourea is converted to the corresponding isothiocyanate; the other half is converted to the amine salt of the acid used, and must be recovered therefrom in order to permit economical operation. The second general method involves a series of reactions: first, the formation of a substituted dithiocarbamate by reacting carbon disulfide with an amine or with a mixture of an amine and an inorganic base; second, treatment with a heavy metal salt, such as mercuric chloride or lead nitrate; and third, decomposition of the heavy metal dithiocarbamate by heating. Due to the cost of materials and amount of labor required, this process is generally uneconomical.

The present invention is based on the reaction of a 1,3-disubstituted thiourea with carbon disulfide under heat and pressure. The reaction may be represented by the following equation:

(1) $RNH-CS-NHR + CS_2 \rightarrow 2RNCS + H_2S$ in which R is an aliphatic or carbocyclic radical.

In order to effect the above reaction, it is not necessary to use a preformed 1,3-disubstituted thiourea. On the contrary, it is possible to start with a primary amine and carbon disulfide. In such a case, the gross over-all reaction may be represented by the equation:

(2) $RNH_2 + CS_2 \rightarrow RNCS + H_2S$

Actually, however, the reaction does not proceed in a single step, but the corresponding 1,3-disubstituted thiourea is formed and is then converted into the isothiocyanate as shown in Equation 1.

In the case of an aryl amine, the formation of the thiourea occurs in a single step, which may be represented by the equation:

(3) $2RNH_2 + CS_2 \rightarrow RNH-CS-NHR + H_2S$

The more strongly basic amines, such as aliphatic and alicyclic amines, react somewhat differently, two steps being involved. The amine first combines with carbon disulfide to form the amine salt of a substituted dithiocarbamic acid, which upon heating splits off hydrogen sulfide and is thereby converted to the corresponding thiourea. The two steps may be represented by the following equations:

(4) $2RNH_2 + CS_2 \rightarrow RNH-CSSNH_3R$ (5) $RNH-CSSNH_3R \rightarrow RNH-CS-NHR + H_2S$ Regardless of whether the thiourea is formed in one step or two, the final reaction whereby the thiourea is transformed to isothiocyanate is in accordance with Equation 1.

Reactions 4 and 5 represent in general the sequence of events when the more strongly basic aliphatic and alicyclic amines are reacted with carbon disulfide. The invention is, of course, not limited to the case where reaction 4 proceeds 100% to completion before any of reaction 5 starts. In some cases the second reaction may start slightly before all of the amine has been transformed into the dithiocarbamate. However, reaction 4 proceeds so much more vigorously and is so exothermic that most of the amine is transformed into the dithiocarbamate before any considerable amounts of thiourea are formed.

Therefore, depending on their commercial availability, either a primary amine or a 1,3-disubstituted thiourea may be used as starting material. The process is not limited to symmetrical disubstituted thioureas, but may employ 1,3-disubstituted thioureas of the formula, $RNH-CS-NHR'$ in which R and R' represent different radicals. For example, 1-phenyl-3-(n-butyl)-thiourea yields by reaction with carbon disulfide an equimolecular mixture of phenyl isothiocyanate and n-butyl isothiocyanate.

The reactions represented by Equations 3 and 4 occur at room temperature or at slightly elevated temperatures (45°–60° C.) such as are obtained by heating at atmospheric pressure mixtures of amines and carbon disulfide. On the other hand, the basic reaction of the invention, represented by Equation 1, occurs only at considerably higher temperatures (100° C. or more) and requires heating under pressure. However, the isothiocyanates decompose somewhat at high temperatures with long heating and therefore it is desirable to use as low a temperature as possible consistent with a reasonable reaction speed.

Usually temperatures in the range of 150 to 250° C. are found to be suitable.

It should be understood that the reaction represented by Equation 1 is reversible, and that removal of hydrogen sulfide is essential to the success of the process. Any suitable means may be employed for the removal of hydrogen sulfide, but the preferred method is to vent it from the reaction vessel at intervals, or still better, continuously at a controlled rate.

Owing to the volatility of carbon disulfide, its vapor tends to escape from the reaction vessel along with the hydrogen sulfide. In many instances, therefore, it is desirable to augment the pressure due to the hydrogen sulfide and carbon disulfide by the controlled admission of a compressed inert gas such as nitrogen. It is further advantageous to cool the vapors while still under pressure by causing them to pass through a well-cooled reflux condenser before reaching the vent valve. In this way it is possible to maintain the reaction mixture at any desired temperature and to prevent the escape or any considerable amount of carbon disulfide along with the vented mixture of nitrogen and hydrogen sulfide. While the use of an inert gas to increase pressure is sometimes desirable and constitutes a specific modification of the present invention, it should be understood that the invention is not broadly limited to such use and effective production of esters of isothiocyanic acid can be obtained in the absence of any added gas.

The course of the reaction may be followed by determining in any suitable manner the amount of hydrogen sulfide vented. When the rate of evolution of hydrogen sulfide has diminished to a point which indicates that further operation is uneconomical, the temperature and pressure may be lowered, and the reaction mixture may be discharged or may be subjected to distillation processes while still in the reaction vessel. In either case, the unreacted carbon disulfide is recovered by suitable means such as distillation at atmospheric pressure. As a rule, the isothiocyanate or isothiocyanates formed in the reaction may also be distilled, either with steam or by fractional distillation at atmospheric or reduced pressure. The residual material consists for the most part of unreacted 1,3-disubstituted thiourea and may be added without further treatment to a subsequent charge. The method of isolating the isothiocyanate from the reaction mixture will depend on its characteristics; if its volatility is too low to permit separation by distillation, some other procedure such as fractional crystallization must be employed.

It is an advantage of the present invention that the pressures and temperatures are not critical. Pressures within the range 100–500 lb./in.$^2$ and temperatures within the range 150°–250° C. have been found satisfactory, but the operation of the process is not necessarily limited to these ranges.

It is also an advantage of the present invention that no serious corrosion problem is presented. Ordinary steel equipment may be used extensively, although it is preferred to use a corrosion-resistant autoclave.

The invention is illustrated by the following specific examples which are typical. Parts are by weight.

*Example 1*

342 parts of commercial thiocarbanilide and an equal weight of carbon disulfide were introduced into an autoclave equipped with a reflux condenser and an inlet for the admission of nitrogen under pressure. The reflux condenser was provided with a suitable venting means. After sealing the autoclave the temperature was raised to about 200° C. and heating continued for about 18 hours. The pressure was held at 125–250 lbs. per sq. in. by controlled venting and intermittent admission of nitrogen under pressure. During this period 43.7 parts of hydrogen sulfide were vented. After completion of the reaction the autoclave was cooled and the unreacted carbon disulfide distilled off at atmospheric pressure, the amount recovered being 199 parts. After all of the excess carbon disulfide was removed the pressure was reduced and phenyl isothiocyanate was distilled off. The yield based on initial thiocarbanilide was 82.2% of theory showing the marked improvement which is obtainable when hydrogen sulfide is vented continuously through a reflux condenser in order to maintain the minimum pressure of hydrogen sulfide over the reaction mixture. The residue consisted of impure thiocarbanilide which can be used in a second batch.

*Example 2*

279 parts of aniline and 456 parts of carbon disulfide were introduced into an autoclave of the type described in Example 1. The temperature was then raised to 190–210° C. and maintained for 12 hours, the pressure ranging from 130 to 280 lbs. per sq. in. 75 parts of hydrogen sulfide were removed by venting.

After the reaction was substantially complete the charge was cooled down and carbon disulfide was distilled off in the amount of 187 parts. After all of the unreacted carbon disulfide was distilled off at atmospheric pressure a vacuum was applied and the phenyl isothio cyanate distilled off. The yield of 84% of the initial aniline was obtained, the residue being an impure thiocarbanilide which can be reused in another batch.

*Example 3*

A mixture of 321 parts of o-toluidine and 456 parts of carbon disulfide was introduced into an autoclave of the type described in Example 1 and heated for 20 hours. The temperature was maintained between 200–210° C. and the pressure from 100–280 lbs. per sq. in. The hydrogen sulfide vented was substantially the same as in Examples 1 and 2.

After the reaction was substantially complete the carbon disulfide was distilled off at atmospheric pressure and the pressure then reduced an o-tolyl isothiocyanate distilled off under a vacuum. A yield in excess of 60% was obtained, the residual material being impure 1,3-di-o-tolylthiourea which can be reused in another batch.

*Example 4*

A mixture of 360 parts of 1,3-dicyclohexylthiourea and 342 parts of carbon disulfide was introduced into an autoclave of the type described in Example 1. The mixture was heated to 155–175° C. and the temperature maintained for 18 hours, the pressure varying from 100 to 245 lbs. per sq. in. During this period 42½ parts of hydrogen sulfide was vented. After the reaction was substantially complete the carbon disulfide was distilled off at atmospheric pressure and the pressure then reduced distilling off the cyclohexyl isothiocyanate under a vacuum. A yield of 76.5% of cyclohexyl isothiocyanate was obtained. The residue was impure dicyclohexylthiourea which can be reused in a subsequent batch.

Example 5

520 parts of 1-phenyl-3-(n-butyl)-thiourea and 570 parts of carbon disulfide were introduced into an autoclave of the type described in Example 1. The temperature was then raised to 175–200° C. and the pressure maintained at 100–220 lbs. per sq. in for 11 hours. During this reaction 39.4 parts of hydrogen sulfide was vented.

The reaction mixture was then cooled and excess carbon disulfide distilled off at atmospheric pressure, followed by a vacuum fractional distillation of the product, thereby equimolecular amounts of substantially pure n-butyl isothiocyanate and phenyl isothiocyanate were obtained.

The distillation residue was partly solid and partly a viscous liquid; it contained large amounts of the unsymmetrical disubstituted thiourea which can be reused.

Example 6

150 parts of carbon disulfide were added to 57 parts of commercial thiocarbanilide in a suitable autoclave. The vessel after sealing was heated to about 220° C. and the pressure held between 240 and 435 lbs. per sq. in. for about 23 hours. The pressure was maintained by slow venting. The autoclave was then cooled and discharged and the product distilled at atmospheric pressure. After all of the unreacted carbon disulfide was removed by distillation a vacuum was applied and the phenyl isothiocyanate produced was distilled off. A yield of about 54.5% of the theoretical was obtained.

The residual impure thiocarbanilide can then be reused.

Example 7

To 114 parts of 1,3-diphenylthiourea in a suitable pressure vessel are added 100 parts of carbon disulfide, and the vessel sealed. The temperature of the reagents is raised to approximately 250° C. and the pressure maintained at 350–400 lb./in.$^2$ by venting of the gases. After seven hours, or when the formation of hydrogen sulfide has subsided, the reaction may be considered complete. The product is steam stripped, and the distillate allowed to settle, whereupon two layers form. The lower layer is distilled first at atmospheric pressure until all carbon disulfide has been removed, and then under a pressure of approximately 15 mm. Phenyl isothiocyanate is recovered as the high-boiling distillate in substantially pure form, in good yield.

The gases evolved during the course of the reaction and during the distillations are scrubbed with a warm dilute caustic solution. The carbon disulfide gas which is not absorbed thereby is liquefied and re-used.

Example 8

To 46.5 parts of aniline in a suitable vessel are added 165 parts of carbon disulfide. The vessel is then sealed and the charge heated and kept at about 220° C. The pressure is maintained between 350–410 lb./in.$^2$ by venting the gases formed. At the end of seven hours or when the evolution of hydrogen sulfide subsides, the reaction is stopped and 32 parts of carbon disulfide are added. The reaction is continued as before for a further 10 hours, or until the evolution of hydrogen sulfide subsides. The reaction is stopped and 150 parts of carbon disulfide are added and the reaction allowed to proceed as before for a further four hours or until the evolution of hydrogen sulfide subsides, when the reaction may be considered complete.

The crude product is a semi-liquid mass consisting largely of phenyl isothiocyanate. It is purified by filtration and vacuum distillation. The desired phenyl isothiocyanate is recovered in substantially pure form in good yield.

The gases evolved are treated as described in Example 7.

Example 9

To 46.5 parts of aniline in a suitable pressure vessel are added 340 parts of carbon disulfide, and the vessel sealed. The temperature of the reagents is raised to 210°–240° C. and a pressure of 275–400 lbs./in.$^2$ maintained by venting of gases. After twelve hours or when the formation of hydrogen sulfide has subsided the reaction may be considered complete.

The remainder of the process is completed as described in Example 7.

Example 10

To 128 parts of 1,3-di-o-tolylthiourea in a suitable pressure vessel are added 100 parts of carbon disulfide, and the vessel sealed. The reagents are heated and kept at about 220° C. for 7 hours and the pressure maintained at 350–400 lbs./in.$^2$ by venting of gases. The product is purified and the gases evolved are treated as described in Example 7.

This application is in part a continuation of my copending application Serial No. 664,432, filed April 23, 1946, which has become abandoned.

I claim:

1. A process of preparing isothiocyanic esters which comprises reacting at least one amine selected from the group consisting of primary amines of the aryl, alicyclic and aliphatic series, with liquid carbon disulfide under pressure at a temperature of at least 100° C. whereby at least one isothiocyanic ester and hydrogen sulfide are formed, and removing the hydrogen sulfide formed during the reaction.

2. A process according to claim 1, in which the temperature is between 150° and 250° C. and the pressure is between 100 and 500 lb./in.$^2$.

3. A process according to claim 1 in which the hydrogen sulfide formed is passed through a condenser maintained at a temperature sufficiently low to condense and strip out carbon disulfide vapors.

4. The process according to claim 1 wherein the pressure is augmented by the controlled admission of an inert gas.

5. A process according to claim 1 wherein the amine is aniline.

6. A process according to claim 1 wherein the amine is o-toluidine.

7. A process of preparing isothiocyanic esters which comprises reacting at least one 1,3-disubstituted thiourea with liquid carbon disulfide under pressure at a temperature of at least 100° C. whereby at least one isothiocyanic ester and hydrogen sulfide are formed, and removing the hydrogen sulfide formed during the reaction.

8. A process according to claim 7, in which the temperature is between 150° and 250° C. and the pressure is between 100 and 500 lb./in.$^2$.

9. A process according to claim 7 in which the hydrogen sulfide formed is passed through a condenser maintained at a temperature suffi- 10. The process according to claim 7 wherein the pressure is augmented by the controlled admission of an inert gas.

11. A process according to claim 7, wherein the thiourea is 1-phenyl-3-n-butyl-thiourea.

12. A process according to claim 7, wherein the thiourea is 1,3-di-o-tolylthiourea.

13. A process according to claim 7 wherein the thiourea is 1,3-dicyclohexylthiourea.

14. A process according to claim 7 wherein the thiourea is thiocarbanilide.

15. A process of preparing isothiocyanic esters which comprises reacting a mixture of at least one 1,3-disubstituted thiourea and at least one amine selected from the group consisting of primary amines of the aryl, alicyclic and aliphatic series, with liquid carbon disulfiide under pressure at a temperature of at least 100° C. whereby at least one isothiocyanic ester and hydrogen sulfide are formed, and removing the hydrogen sulfide formed during the reaction.

16. A process according to claim 15 in which the temperature is between 150° and 250° C. and the pressure is between 100 and 150 lb./in.$^2$.

17. A process according to claim 15 in which the hydrogen sulfide formed is passed through a condenser maintained at a temperature sufficiently low to condense and strip out carbon disulfide vapors.

18. The process according to claim 15 wherein the pressure is augmented by the controlled admission of an inert gas.

19. A process according to claim 15, wherein the thiourea is 1,3-diphenylthiourea and the amine is aniline.

RALPH E. SAYRE.

REFERENCES CITED

The following references are of record in the file of this patent:

UNITED STATES PATENTS

| Number | Name | Date |
| --- | --- | --- |
| 1,724,580 | Hand et al. | Aug. 13, 1929 |
| 2,263,386 | Hester | Nov. 18, 1941 |

OTHER REFERENCES

Degering: Outline of Organic Nitrogen Compounds (1945), pp. 547–548.

Chemical Abstracts, vol. 31 (1937), cols. 1377 and 4286, abstracting two papers by Drozdov in J. Gen. Chem. (U. S. S. R.); vol. 6, pp. 1368–1374 and vol. 7, pp. 185–187.

Chemical Abstracts, vol. 34 (1940), cols. 3685–3686, abstracting a paper by Yakubovich et al. in J. Gen. Chem. (U. S. S. R.), vol. 9, pp. 1777–82.